United States Patent [19]

Stuart

[11] 4,133,912
[45] Jan. 9, 1979

[54] REFINISHING OF THE SURFACES OF BODIES OF A THERMOPLASTIC

[75] Inventor: Manfred Stuart, Burnaby, Canada

[73] Assignee: Stuart Plastics Ltd., Burnaby, Canada

[21] Appl. No.: 817,204

[22] Filed: Jul. 20, 1977

[30] Foreign Application Priority Data

Jul. 21, 1976 [CA] Canada .................................. 257509

[51] Int. Cl.² .......................................... B32B 35/00
[52] U.S. Cl. .................................... 427/140; 156/94; 156/98; 264/36; 264/83; 264/341; 427/335
[58] Field of Search .................. 427/140, 335; 264/83, 264/341, 36; 156/94, 98

[56] References Cited

U.S. PATENT DOCUMENTS

| | | | |
|---|---|---|---|
| 3,327,033 | 6/1967 | Koch et al. | 264/83 |
| 3,684,553 | 8/1972 | VanDyk | 427/335 |
| 3,737,499 | 6/1973 | Kamena | 264/341 |

*Primary Examiner*—Thomas J. Herbert, Jr.
*Attorney, Agent, or Firm*—Fulwider, Patton, Rieber, Lee & Utecht

[57] ABSTRACT

A process for refinishing the surface of a body of a thermoplastic resin by subjecting the surface to treatment with a solvent. The surface is cooled, together with at least the material underlying the surface, to a temperature below the temperature at which the solvent can readily dissolve the resin. The surface of the body is then contacted with a solvent for a time sufficient to dissolve the surface but not to warm appreciably the inner layer of the body. The process avoids distortion in the refinished surface.

8 Claims, 1 Drawing Figure

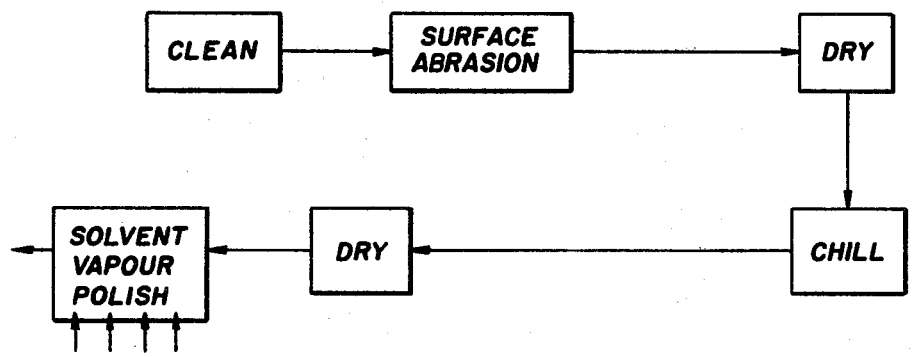

REFINISHING OF THE SURFACES OF BODIES OF A THERMOPLASTIC

FIELD OF THE INVENTION

This invention relates to the refinishing of the surfaces of bodies of a thermoplastic resin. In a preferred embodiment the invention relates to a process for refinishing the surfaces of telephone sets.

DESCRIPTION OF PRIOR ART

The refinishing of used and scratched articles of thermoplastic resin is well known. It has been known for some time that a solvent treatment of the surface can remove scratches by dissolving the surface layer and then redistributing the dissolved plastic. In particular, surfaces of articles made from acrylonitrile-butadiene-styrene copolymer have been treated in this way. The solvents used vary widely. However, typical solvents include dichloroethane and trichlorotrifluoroethane. A mixture of these two solvents has also been used. Other solvents that have been used include ketones, particularly acetone and methyl ethyl ketone, chlorinated hydrocarbons, toluene, xylene, perchloroethylene and trichloroethylene. These solvents may be diluted with certain inert materials that will not dissolve plastics.

In addition to the above ABS resins, it is also known to refinish acrylic resins, acetates, butyrates, polycarbonates and polystyrene by solvent treatment. Generally speaking the resins may all be treated with the same solvents. That is the resins applicable for the refinishing of the surface of a body of one resin can also usually be used to refinish the surface of a body of another resin.

An article of a thermoplastic resin that needs to be refinished is usually stressed in two ways. First, there are internal stresses produced in the molding of the article. These stresses are particularly pronounced, first at that part of the article that was originally close to the gate to an injection mold when the article was produced and, secondly, at those parts surrounding points in the die where the plastic material changed direction during molding or where two fronts or different columns of resin meet. In a thin walled article the above internal stresses may stretch right through the article.

The second sort of stresses are those induced by marring the surface of the resin.

During the refinishing of the surface by solvents, the internal stresses can cause problems. In particular, the internal stresses can be released and can produce undulations in the surface of the article during the solvent process to remove surface scratches and the like.

SUMMARY OF THE INVENTION

The present invention seeks to provide a method of refinishing the surface of a body of a thermoplastic resin that does not have the above disadvantage.

It is believed that the release of the stresses, and hence the unevenness in the refinishing surface, arise because the solvent tends to permeate into the interior of the resin. The thus softened resin releases its stresses and this causes the uneven surface.

Accordingly, the present invention is in a process for refinishing the surface of a body of a thermoplastic resin by subjecting the surface to treatment with a solvent and is the improvement that comprises cooling the surface and at least the resin underlying the surface to a temperature below the temperature at which the solvent can readily dissolve or soften the resin then contacting the surface of the body with a solvent for a time sufficient to dissolve the surface but not to warm appreciably the resin underlying the surface of the body.

In a preferred embodiment the whole body to be refinished is cooled.

Typically, cooling is to a temperature below 60° F. and, desirably, to a temperature in the ranges about −40° F. to about 40° F. and about −20° F. to about 40° F. Generally speaking, unless it is possible to refrigerate the whole plant, the temperature should not be too far below the ambient temperature as, particularly in a moist temperature, low temperatures can cause condensation of moisture onto the surface with consequent imperfections in the refinished surface. Generally the more active the solvent in dissolving the resin the lower the temperature used.

DESCRIPTION OF DRAWINGS

The invention is illustrated, by way of example, in the FIGURE which is a schematic, block diagram illustrating a complete process according to the present invention.

DESCRIPTION OF PREFERRED EMBODIMENT

Referring to the drawing, when a body of a thermoplastic resin is to be refinished, particularly the components of a telephone set, the components are first subjected to a cleaning process. Typically this can be carried out by immersing and scrubbing the body of the resin in a surface-active material, for example a synthetic detergent. After this first cleaning, which can also be used to remove pieces of paper and the like adhering to the surface, the article may be abraded to remove the deeper scratches and imperfections in the surface. The surface abrasion may be carried out by buffing the surface, by tumbling the articles with abrasive granules, by grinding or any similar, known process.

After the surface abrasion, the articles are dried. They are then desirably placed in a tray, for example a tray that can hold up to fifty telephone sets. On the tray the articles are then passed into a refrigerated unit where they are chilled. Simple refrigeration systems, for example those using the halogenated hydrocarbons available under the trade mark FREON, can be used. In a typical embodiment, fifty telephone sets were maintained in the chilling chamber for eight minutes. The temperature of the chilling chamber was 40° F. The tray is moved through the cold chamber. The dwell time will vary with the thickness of the article. The thicker the article, the longer the dwell. However, the dwell time should be adjusted so that at least the surface of the article and the underlying layer leave the chilling chamber at the desired temperature.

After the cooling treatment the articles are dried; generally air drying is sufficient. They are then passed into a solvent vapour. A simple heated coil can be positioned in the base of a bath that also contains a relatively volatile solvent. By heating of the coil the solvent is evaporated. Desirably the trays containing the articles may be lowered into the chamber and thus the vapour of the solvent. The walls of the solvent vapour chamber should be sufficiently high so that condensation of the solvent vapours can take place and, desirably, cooling coils are positioned in the vapour to assist condensation. Furthermore, to avoid any possible pollution hazards, extraction fans and condensors should be positioned over the solvent vapour baths.

With the treatment of ABS telephone sets it has been found desirable to use methylene chloride or mixtures of halogenated hydrocarbons as the solvent vapour.

The process according to the present invention and, in particular, incorporating a chilling step into a solvent refinishing process, has provided excellent results. One passage of the article through the illustrated process has proved adequate. Surface deformation after the process has not been observed.

The process is applicable to any thermoplastic resin that can be dissolved by a solvent. It is believed that the process works by cooling the layers underlying the surface layer, that is the layers that are not required to be treated, to such an extent that the solvent does not become absorbed in them and therefor these layers are not softened. As they are not softened they do not move under the presence of the internal stresses. Further the colder the plastic the less it can move to relieve the stresses.

Of course if the whole body is cooled the above also applies.

I claim:

1. In a process for refinishing the surface of a body of a thermoplastic resin selected from acrylonitrile-butadiene-styrene (ABS) and polystyrene by subjecting the surface to treatment with a solvent the improvement that comprises cleaning the body then cooling the surface and at least the material underlying the surface to a temperature in the range about −40° F. to about 40° F. then contacting the surface of the body with the solvent in vapor form for a time sufficient to dissolve the surface but not to warm appreciably the inner layer of the body.

2. A process as claimed in claim 1 in which the whole body is cooled.

3. A process as claimed in claim 1 in which the temperature is in the range about −20° F. to about 40° F.

4. A process as claimed in claim 1 in which the solvent is methylene chloride alone or in a mixture with another halogenated hydrocarbon.

5. A process for refinishing the surface of a body of a thermoplastic resin selected from acrylonitrile-butadiene-styrene (ABS) and polystyrene that comprises subjecting the body to a preliminary degreasing and cleaning;
  removing scratches from the surface;
  cooling the surface of the body and at least the underlying layer to a temperature in the range about −40° F. to about 40° F.;
  drying the body; and
  subjecting the body to a treatment with the vapor of a solvent.

6. A process as claimed in claim 5 in which the whole body is cooled.

7. A process as claimed in claim 5 in which the temperature is in the range about 20° F. to about 40° F.

8. A process as claimed in claim 5 in which the body of the thermoplastic resin is a telephone component.

* * * * *

UNITED STATES PATENT AND TRADEMARK OFFICE
CERTIFICATE OF CORRECTION

PATENT NO. : 4,133,912
DATED : January 9, 1979
INVENTOR(S) : Manfred Stuart

It is certified that error appears in the above–identified patent and that said Letters Patent are hereby corrected as shown below:

Claim 7, line 2, change "20° F." to -- -20° F. --

Signed and Sealed this

Tenth Day of July 1979

[SEAL]

Attest:

Attesting Officer

LUTRELLE F. PARKER
*Acting Commissioner of Patents and Trademarks*